(12) United States Patent
Oh

(10) Patent No.: US 9,965,919 B2
(45) Date of Patent: May 8, 2018

(54) CASINO DEVICE, CASINO TABLE, AND CASINO GAME ROOM

(71) Applicants: NEO ICP KOREA, INC., Hwaseong-si, Gyeonggi-do (KR); BUSINESS LEADER GLOBAL LIMITED, Hong Kong (CN)

(72) Inventor: Kyoung Suck Oh, Seoul (KR)

(73) Assignees: NEO ICP KOREA, INC., Seoul (KR); BUSINESS LEADER GLOBAL LIMITED, Hong Kong (CN)

( * ) Notice: Subject to any disclaimer, the term of this patent is extended or adjusted under 35 U.S.C. 154(b) by 445 days.

(21) Appl. No.: 14/377,025

(22) PCT Filed: Jun. 24, 2014

(86) PCT No.: PCT/KR2014/005567
§ 371 (c)(1),
(2) Date: Aug. 6, 2014

(87) PCT Pub. No.: WO2015/174575
PCT Pub. Date: Nov. 19, 2015

(65) Prior Publication Data
US 2016/0284160 A1    Sep. 29, 2016

(30) Foreign Application Priority Data
May 16, 2014  (KR) .......................... 10-2014-0059242

(51) Int. Cl.
*G07F 17/32*   (2006.01)
*G06Q 50/34*   (2012.01)
(Continued)

(52) U.S. Cl.
CPC ..... *G07F 17/3225* (2013.01); *G06K 7/10782* (2013.01); *G06Q 20/102* (2013.01);
(Continued)

(58) Field of Classification Search
CPC ...................................................... G07F 17/32
See application file for complete search history.

(56) References Cited

U.S. PATENT DOCUMENTS 5,371,345 A * 12/1994 LeStrange .......... G06Q 20/3437
                                                235/380
5,836,818 A * 11/1998 Jones .................. A63F 3/00157
                                                273/309
(Continued)

FOREIGN PATENT DOCUMENTS

CN          1577388 A      2/2005
CN        202159387 U      3/2012
(Continued)

OTHER PUBLICATIONS

International Search Report Appln. No. PCT/KR2014/005567; dated Jun. 24, 2014.
(Continued)

*Primary Examiner* — Omkar Deodhar
(74) *Attorney, Agent, or Firm* — Ladas & Parry LLP

(57) ABSTRACT

A casino device includes a drop box, a bill processor used by an employee to check cash of a customer when the customer purchases chips in cash, a reader configured to read a barcode or magnetic stripe or IC chip of a card, a ticket, or a form of the customer, a ticket printer configured to print the ticket on which a exchange is displayed when the customer requests the exchange for the chips, a display configured to provide money amount information to the customer when the employee processes business using the bill processor, the reader, or the ticket printer and provide the money amount information to a closed circuit television camera and recording device, and a monitor configured to provide the employee with the money amount information
(Continued)

provided to the display and transaction information between employees or between the employee and the customer.

12 Claims, 2 Drawing Sheets

(51) Int. Cl.
    *G06K 7/10*     (2006.01)
    *G06Q 20/10*     (2012.01)
    *G06Q 20/18*     (2012.01)
    *G06Q 40/02*     (2012.01)
    *G07G 1/00*     (2006.01)

(52) U.S. Cl.
    CPC ........... *G06Q 20/18* (2013.01); *G06Q 40/025* (2013.01); *G06Q 50/34* (2013.01); *G07F 17/322* (2013.01); *G07F 17/3293* (2013.01); *G07G 1/0045* (2013.01)

(56) References Cited

U.S. PATENT DOCUMENTS

| | | | |
|---|---|---|---|
| 6,968,787 B2 | 11/2005 | Heidel et al. | |
| 7,491,125 B2 | 2/2009 | Mathis et al. | |
| 2002/0034299 A1* | 3/2002 | Charrin | G07F 17/32 380/251 |
| 2007/0057469 A1 | 3/2007 | Grauzer et al. | |
| 2007/0060307 A1* | 3/2007 | Mathis | G07F 17/32 463/25 |
| 2012/0325616 A1* | 12/2012 | Mishra | G07D 11/0003 194/206 |
| 2013/0180820 A1 | 7/2013 | Lee | |
| 2013/0316797 A1 | 11/2013 | Gelinotte et al. | |

FOREIGN PATENT DOCUMENTS

| | | |
|---|---|---|
| KR | 1020080027603 A | 3/2008 |
| KR | 1020090072280 A | 7/2009 |
| KR | 1020090126510 A | 12/2009 |
| KR | 1020100053740 A | 5/2010 |
| KR | 10-0992185 B1 | 10/2010 |
| KR | 10-1022759 B1 | 3/2011 |
| KR | 10-1186490 B1 | 9/2012 |
| KR | 1020130023572 A | 3/2013 |
| KR | 1020130096110 A | 8/2013 |
| WO | 2013/100454 A1 | 7/2013 |

OTHER PUBLICATIONS

Korean Office Action dated Jan. 28, 2016; Appln. No. 10-2014-0059242.

* cited by examiner

CASINO DEVICE, CASINO TABLE, AND CASINO GAME ROOM

FIELD OF THE INVENTION

The present invention relates to a casino device, a casino table, and a casino game room.

BACKGROUND ART

A casino refers to a place in which table games such as poker, blackjack, or baccarat and games using a device such as a slot machine can be enjoyed. In general, in a casino, a plurality of games are played using casino chips as money. A casino table is used in table games in which a plurality of customers can play at a time.

The center of the casino table is used to open cards for the game or for a dealer to take losing chips or pay winning chips during the game. A plurality of casino tables are arranged in a casino game room. A casino manager manages two or eight casino tables as one pit. The casino manager is referred to as a supervisor, a floor person, a pit boss, a shift manager, or the like.

The dealer provides various services for the convenience of customers, explains game rules to the customers, enables the game to progress using cards, a roulette wheel, or dice after determining whether participants are seated and whether a prescribed amount of money has been bet, pays chips to a customer or takes chips from the customer according to winning or losing of the game, exchanges the chips of the customer, and notifies the casino manager of the presence of a person who performs suspicious actions during the game.

Also, the dealer is responsible for requesting a casino cage to fill chips when the chips are insufficient on a corresponding casino table and requesting the casino cage to withdraw the chips when the chips are excessive.

As described above, the dealer performs various tasks and even a skilled dealer spends a great deal of time handling cash and chips rather than simply continuing the game with customers, and error may occur due to mistakes or the like.

Also, mistakes, errors, and unfair practices have to be prevented in the cash and chips handling process of the dealer in the casino game room. Because the casino game room is open 24 hours a day and 365 days a year and chips of a large amount of money are delivered in a game progress process, it is difficult to substantially perform real-time check or follow-up check in reality so as to prevent mistakes, errors, and unfair practices.

Further, because the dealer spends a great deal of time handling the cash and chips, such as chips purchase, chips exchange, chips fill, chips withdraw, or storage of chips received as tips, the progress of the game is frequently delayed, causing errors and unfair practices frequently occur, and these problems have still not been solved.

In U.S. Pat. No. 6,968,787 B2, technology of inserting notes such as bills and tickets into a bill validator, accepting normal notes, and rejecting abnormal (counterfeit) notes to reduce the risk and save the time of the dealer is disclosed. However, because a medium recognized by the bill processor as normal notes is immediately stored in a stacker, there is a problem in that a conflict may occur between a customer and the dealer when an amount of money assumed by a customer is different from an amount of money recognized by the bill processor. In addition, the technology disclosed in U.S. Pat. No. 6,968,787 B2 has a limitation in terms of improving work efficiency of the dealer and enhancing security because content of giving a exchange for chips or filling or withdrawing the chips is not mentioned.

CITATION LIST

Patent Literature

U.S. Pat. No. 6,968,787 B2 (Date of Patent: Nov. 29, 2005)

DISCLOSURE OF THE INVENTION

Problems to be Solved by the Invention

The present invention has been made to solve problems of the conventional technology and an objective of the present invention is to provide a casino device, a casino table, and a casino game room for saving the time of a dealer in a cash and chips handling process, preventing errors and unfair practices from occurring in the cash and chips handling process of the dealer, improving a customer satisfaction rate, and employing a ticket on the casino table.

Means for Solving the Problem

According to an aspect of the present invention, there is provided a casino device including: a drop box provided within a body; a bill processor provided in an upper portion of the body and used by an employee to check cash of a customer when the customer purchases chips in cash; a reader provided in the upper portion of the body and configured to read a barcode or magnetic stripe or IC chip of a card of the employee or the customer, a barcode of a ticket, or a barcode of a form; a ticket printer provided in the upper portion of the body and configured to print the ticket on which a exchange is displayed when the customer requests the exchange for the chips; a display provided in the upper portion of the body and configured to provide money amount information to the customer when the employee processes business using the bill processor, the reader, or the ticket printer and provide the money amount information to a closed circuit television (CCTV) camera and recording device; and a monitor provided in the upper portion of the body and configured to provide the employee with the money amount information provided to the display and transaction information between employees or between the employee and the customer.

Specifically, at least one drop box configured to store cash, tickets, forms, and tip chips may be provided.

Specifically, the reader may include: an employee card reader used to identify an identity of the employee by recognizing an employee card of the employee for requesting to fill or withdraw the chips when the chips are insufficient or excessive in a casino table; a barcode reader configured to read a barcode of the ticket or the form; and a customer card reader used to identify an identity of the customer by recognizing a customer card of the customer desiring to purchase the chips using a credit loan.

Specifically, the display may include: a customer display configured to provide the money amount information to the customer; and a CCTV display configured to display the money amount information so that the CCTV camera and recording device photographs, records, and stores the money amount information.

Specifically, when the customer purchases the chips in cash, the customer display may display an amount of money of the cash inserted into the bill processor to enable the customer to identify the displayed money amount.

Specifically, when the customer purchases the chips using a ticket, the customer display may display at least portion of an amount of money of the ticket read by the barcode reader to enable the customer to identify the displayed money amount.

Specifically, when the customer purchases the chips using a credit loan, the customer display may display an amount of money of the credit loan input to the monitor by the employee reading the customer card using the customer card reader to enable the customer to identify the displayed money amount.

Specifically, when the customer requests to exchange the chips for a ticket, the customer display may display a total amount of money of the chips based on types of the chips of the customer and the number of chips input by the employee to the monitor to enable the customer to identify the displayed total amount of money.

Specifically, when the customer repays a credit loan using the chips, the customer display may display a total amount of money of the chips based on types of the chips of the customer and the number of chips input by the employee to the monitor to enable the customer to identify the displayed total amount of money.

Specifically, the CCTV display may include a plurality of indicating lights configured to indicate states of 'chips purchase', 'chips exchange', 'chips fill', 'chips withdraw', 'cash', 'ticket', 'credit loan', and 'tip'.

Specifically, when the customer purchases the chips in cash, the CCTV display may display the same money amount as an amount of money of the cash displayed on the customer display to enable the CCTV camera and recording device to primarily photograph, record, and store a display result. When the cash is stored in the drop box, the CCTV display may turn on the 'chips purchase' and 'cash' indicating lights while displaying types of chips to be provided to the customer, the number of chips, and a transaction type to enable the CCTV camera and recording device to secondarily photograph, record, and store a display result.

Specifically, when the customer purchases the chips using a ticket, the CCTV display may display the same money amount as at least portion of an amount of money of the ticket displayed on the customer display to enable the CCTV camera and recording device to primarily photograph, record, and store a display result. When the ticket is stored in the drop box, the CCTV display may turn on the 'chips purchase' and 'ticket' indicating lights while displaying types of chips to be provided to the customer, the number of chips, and a transaction type to enable the CCTV camera and recording device to secondarily photograph, record, and store a display result.

Specifically, when the customer purchases the chips using a credit loan, the CCTV display may display the same money amount as an amount of money of the credit loan displayed on the customer display to enable the CCTV camera and recording device to primarily photograph, record, and store a display result. The CCTV display turns on the 'chips purchase' and 'credit loan' indicating lights while displaying types of chips to be provided to the customer, the number of chips, and a transaction type to enable the CCTV camera and recording device to secondarily photograph, record, and store a display result.

Specifically, when the customer requests to exchange the chips for a ticket, the CCTV display may turn on the 'chips exchange' and 'ticket' indicating lights while displaying types of the exchanged chips and the number of chips when the employee inputs an 'OK' button to the monitor after the customer has confirmed a total amount of money of the chips displayed on the customer display, thereby enabling the CCTV camera and recording device to photograph, record, and store a display result.

Specifically, when the customer requests to repay a credit loan using the chips, the CCTV display may turn on the 'chips exchange' and 'credit loan' indicating lights while displaying types of the chips of the replacement and the number of chips when the employee inputs an 'OK' button to the monitor after the customer has confirmed a total amount of money of the chips displayed on the customer display, thereby enabling the CCTV camera and recording device to photograph, record, and store a display result.

Specifically, when the employee stores the chips received as a tip from the customer, the CCTV display may turn on the 'tip' indicating light while displaying types of the chips and the number of chips recognized by a radio frequency (RF) reader of the drop box when the employee inputs a 'tip' button to the monitor and tip chips are inserted into the drop box, thereby enabling the CCTV camera and recording device to photograph, record, and store a display result.

Specifically, when the employee requests a casino cage to fill the chips, the CCTV display may turn on the 'chips fill' indicating light while displaying types of the chips and the number of chips when an 'OK' button is input to the monitor by the employee comparing content written on a chips fill form to content displayed on the monitor and comparing types of chips and the number of chips displayed on the monitor to those of actual chips received from the casino cage, thereby enabling the CCTV camera and recording device to photograph, record, and store a display result. Specifically, when the employee requests a casino cage to withdraw the chips, the CCTV display may turn on the 'chips withdraw' indicating light while displaying types of the chips and the number of chips when an 'OK' button is input to the monitor through another employee comparing actual chips withdrawn from the employee to content written on a form and content displayed on the monitor, thereby enabling the CCTV camera and recording device to photograph, record, and store a display result.

Specifically, when the customer purchases the chips in cash, the monitor may display an amount of money of the cash inserted into the bill processor, receive an 'OK' button from the employee receiving an acknowledgement of the customer, and display types of chips to be provided to the customer, the number of chips, and a transaction type when the cash is stored in the drop box, thereby enabling the employee to identify the displayed types of chips, the displayed number of chips, and the displayed transaction type.

Specifically, when the customer purchases the chips using a ticket, the monitor may display at least portion of an amount of money of the ticket read by the barcode reader, receive an 'OK' button from the employee receiving an acknowledgement of the customer, and display types of chips to be provided to the customer, the number of chips, and a transaction type when the ticket is stored in the drop box, thereby enabling the employee to identify the displayed types of chips, the displayed number of chips, and the displayed transaction type.

Specifically, when the customer purchases the chips using a credit loan, the monitor may receive an input of an amount of money requested by the customer from the employee causing the customer card reader to read a customer card, receive an 'OK' button from the employee receiving an acknowledgement of the customer, and display types of chips to be provided to the customer, the number of chips, and a transaction type, thereby enabling the employee to identify the displayed types of chips, the displayed number of chips, and the displayed transaction type.

Specifically, when the customer exchanges the chips for a ticket, the monitor may receive and display an input of types of chips and the number of chips from the employee receiving the chips from the customer to enable the employee to identify the displayed input, and receives an input of an 'OK' button from the employee receiving an acknowledgement of the customer.

Specifically, when the customer requests to repay a credit loan using the chips, the monitor may receive and display an input of types of the chips and the number of chips from the employee receiving the chips from the customer to enable the employee to identify the displayed input, and receives an input of an 'OK' button from the employee receiving an acknowledgement of the customer.

Specifically, when the employee stores the chips received as a tip, the monitor may receive an input of a 'tip' button from the employee receiving the tip chips from the customer and display types of the chips and the number of chips read by an RF reader of the drop box into which the tip chips are inserted, thereby enabling the employee to identify the types of chips and the number of chips.

Specifically, when the employee requests a casino cage to fill the chips, the monitor may receive an input of types of the chips and the number of chips from the employee, receive an input of an 'OK' button from the employee comparing the types of the chips and the number of chips displayed on the monitor to those of a chips fill form received from the casino cage and those of actual chips, and displays the types of filled chips and the number of filled chips, thereby enabling the employee to identify the displayed types of filled chips and the displayed number of filled chips.

Specifically, when the employee requests a casino cage to withdraw the chips, the monitor may receive an input of types of the chips and the number of chips from the employee, receive an input of an 'OK' button from another employee comparing the types of the chips and the number of chips displayed on the monitor to those of a chips withdraw form received from the casino cage and those of actual chips, thereby enabling the employee to identify the displayed types of withdrawn chips and the displayed number of withdrawn chips, thereby enabling the another employee to identify the displayed types of withdrawn chips and the displayed number of withdrawn chips.

According to an aspect of the present invention, there is provided a casino table including: the above-described casino device; a game space configured to provide a space for enabling a customer to play a game; and a chips tray configured to store a plurality of chips necessary for the game.

Specifically, the game space may include: a betting region in which the customer places betting money; and a center region in which a card for the game is open or through which the betting chips or winning chips to be paid to the customer pass.

According to an aspect of the present invention, there is provided a casino game room including: at least one casino table having the above-described casino device; a casino cage configured to manage a transaction record, cash, or chips in a secure region within a gaming facility; a casino management system configured to transmit and receive data from and to the casino cage using wired or wireless communication; and a server arranged in a central office and configured to control the casino cage, the casino table, and the casino device through the casino management system.

Specifically, the casino cage may include: a main cage configured to fill the chips to the employee or withdraw the chips from the employee according to a request of the employee; and a cashier cage configured to work to exchange and record transaction and exchange cash for chips or a ticket received from the customer or perform transaction of the chips and the form with the main cage.

Effect of the Invention

In a casino device, a casino table, and a casino game room according to the present invention, a dealer may store all content occurring between the dealer and a customer at the time of cash and chips handling such as chips purchase, chips exchange, or storage of chips received as a tip in real time so that the content may be identified by the dealer, the customer, and a manager in real time, and store all content occurring between the dealer and a casino cage at the time of cash and chips handling such as chips fill and chips withdraw is stored in real time so that the content may be identified by the dealer, a supervisor, and a security member in real time. Accordingly, the time of the dealer may be saved in the cash and chips handling process on the casino table and an error and unfair practices in the cash and chips handling process of the dealer may be prevented, and a customer satisfaction rate may be improved.

In addition, in the casino device, the casino table, and the casino game room according to the present invention, the convenience for customers may be improved because it is not necessary for the customer to carry and move chips by employing a ticket on the casino table.

In addition, in the casino device, the casino table, and the casino game room according to the present invention, a dealer and a supervisor may identify a state of a drop box in real time by electronically implementing the drop box.

MODE(S) FOR CARRYING OUT THE INVENTION

Figure 1:
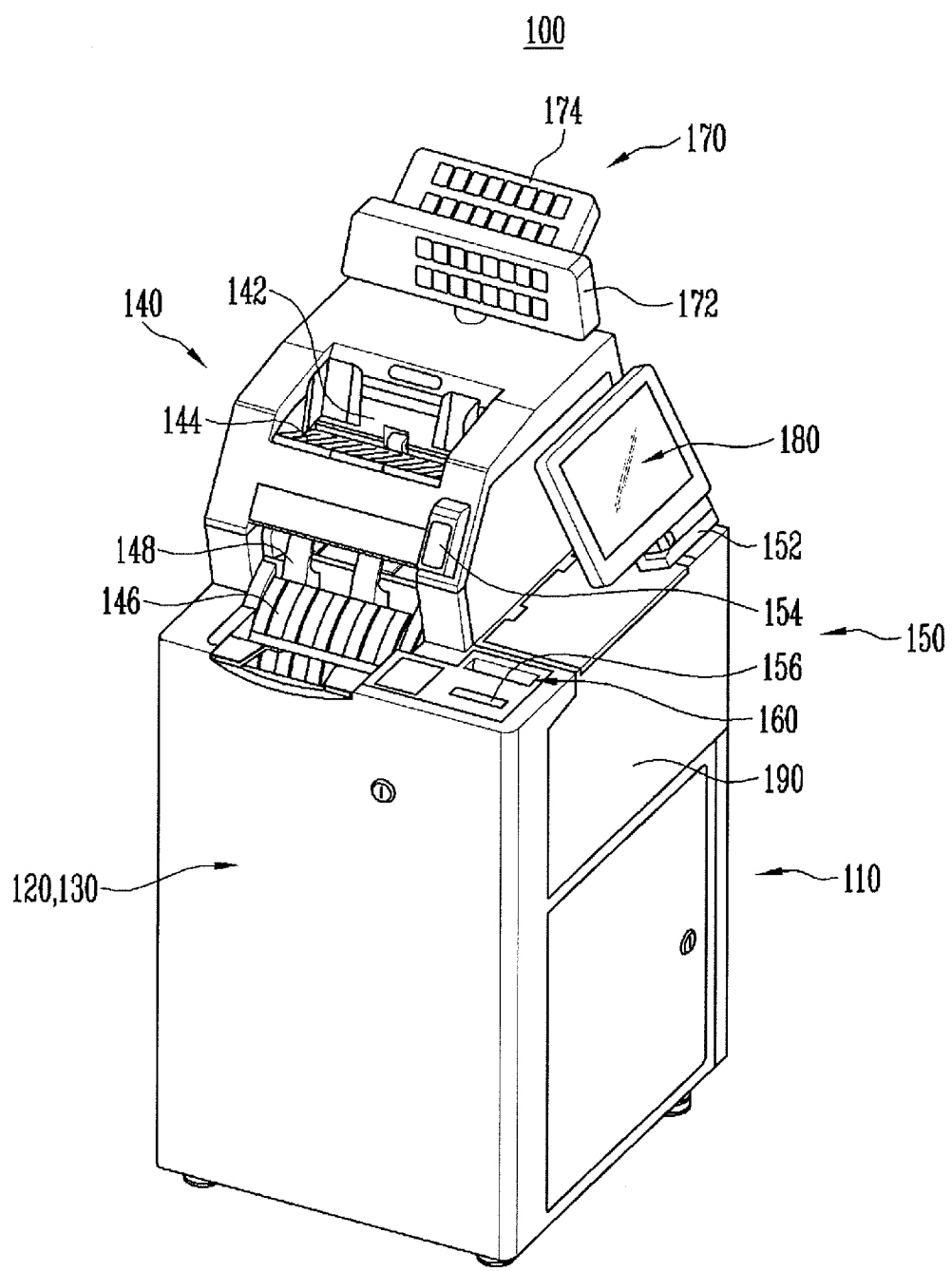
FIG. 1 is a perspective view of a casino device according to an exemplary embodiment of the present invention.

The above and other features and advantages of the present invention will become more apparent to those of ordinary skill in the art by describing in detail exemplary embodiments thereof with reference to the attached drawings. In the drawings, the same or similar elements are denoted by the same reference numerals even when they are depicted in different drawings. In the following description of the present invention, a detailed description of known functions and configurations incorporated herein is omitted when it may make the subject matter of the present invention unclear.

Hereinafter, preferred embodiments of the present invention will be described in more detail with reference to the accompanying drawings.

[Specific Content of Present Invention Based on Configuration]

Figure 2:
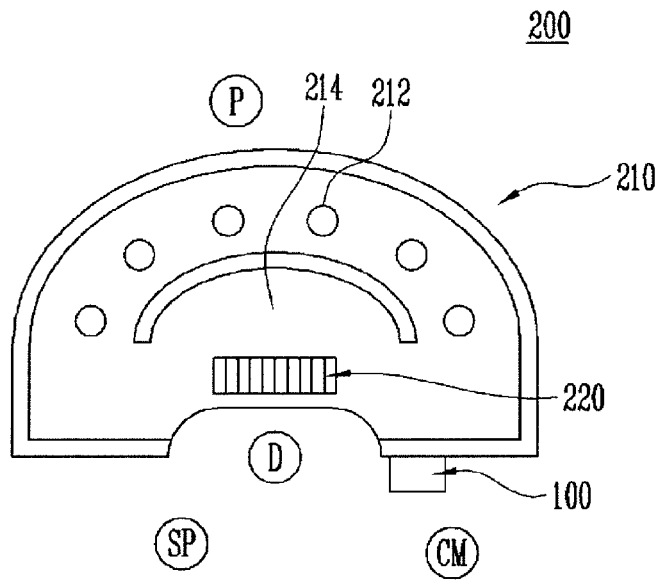
FIG. 2 is a schematic diagram illustrating a casino table to which the casino device is applied according to an exemplary embodiment of the present invention.
Figure 3:
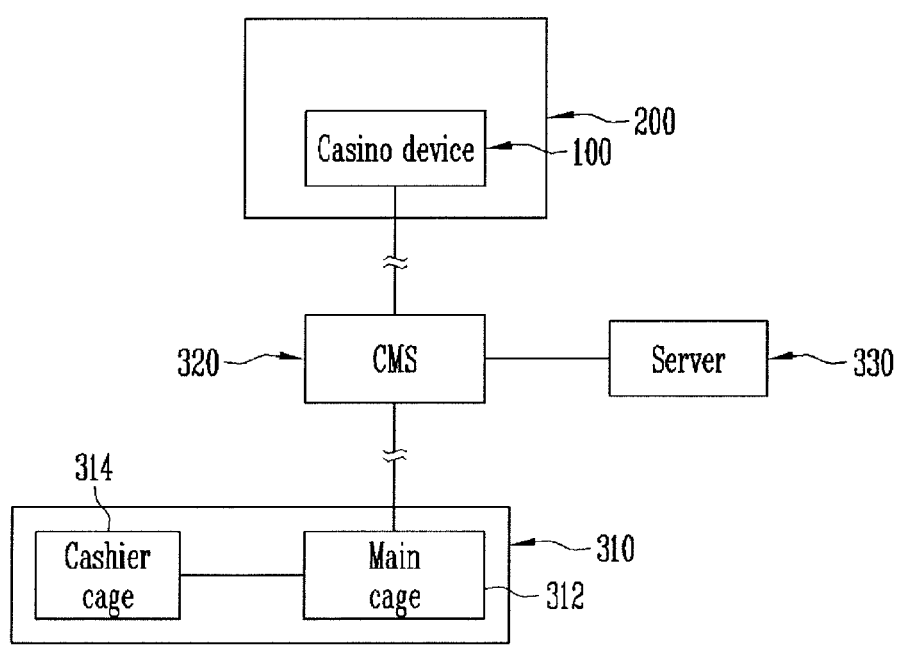
FIG. 3 is a schematic diagram of a casino game room to which the casino device is applied according to an exemplary embodiment of the present invention.

FIG. 1 is a perspective view of a casino device according to an exemplary embodiment of the present invention, FIG. 2 is a schematic diagram illustrating a casino table to which the casino device is applied according to an exemplary embodiment of the present invention, and FIG. 3 is a schematic diagram of a casino game room to which the casino device is applied according to an exemplary embodiment of the present invention.

As illustrated in FIGS. 1 to 3, the casino device 10 according to the exemplary embodiment of the present invention includes a body 110, first and second drop boxes 120 and 130, a bill processor 140, a reader 150, a ticket printer 160, a display 170, a monitor 180, and a computer 190. The casino table 200 to which the casino device is applied according to the exemplary embodiment of the present invention includes the casino device 100, a game space 210, and a chips tray 220. The casino game room 300 to which the casino device is applied according to the exemplary embodiment of the present invention includes the casino table 200, the casino device 100, a casino cage 310, a casino management system 320, and a server 330.

The body 110 may internally include the first and second drop boxes 120 and 130 to be described later, an electronic/electrical facility (not illustrated) to operate the casino device 100, and a plurality of doors which are not denoted by reference numerals. In an upper portion of the body 110, the bill processor 140, the reader 150, the ticket printer 160, the display 170, the monitor 180, etc. to be described later may be provided.

The first and second drop boxes 120 and 130 may be provided inside the body 110. In the first and second drop boxes 120 and 130, cash or a ticket received from a customer P, various types of forms created by a dealer D or a security member CM, chips which are a tip received from the customer P, etc. may be stored.

The first and second drop boxes 120 and 130 are electronically configured, are connected to the server 330 to be described later, and provide all data to be stored to the server 330, thereby enabling the dealer D and the supervisor SP to identify a storage state in real time through the monitor 180 to be described later.

The first drop box 120 may be configured to store cash or tickets and the second drop box 130 may be configured to store forms and tip chips. An object to be stored and a drop box to store the object may be configured to differ according to necessity. Also, an example of the two first and second drop boxes 120 and 130 has been described in this exemplary embodiment, but, of course, one or three or more drop boxes may be provided.

The bill processor 140 may be provided in the upper portion of the body 110, and may be used when the customer P desiring to continue to play the game on the corresponding casino table 200 requests the dealer D to purchase the chips in cash.

The bill processor 140 may be configured to include a hopper 142 into which bills are inserted, a bill validator 144 configured to validate whether a bill is normal, an escrow 146 configured to primarily deposit the bills, and a rejecter 148 configured to return the bills.

In addition, the bill processor 140 may be configured to further include a customer display 172 to be described later.

The present invention is not limited to the bill processor 140 including the above-described configuration in this exemplary embodiment, and may include a configuration of the generally used bill processor.

When a bill received by the dealer D from the customer P is inserted into the hopper 142, the bill processor 140 validates whether the bill is normal in the bill validator 144. The bill processor 140 may be connected to the customer display 172 to be described later and the monitor 180 to be described later and configured to display an amount of money of the normal bill on the customer display 172 and the monitor 180. Accordingly, the customer P may identify the amount of money through the customer display 172 and the dealer D may identify the amount of money through the monitor 180. The dealer D presses an 'OK' button on the monitor 180 after obtaining agreement from the customer P, so that the same amount of money as the identified amount of money is displayed on a CCTV display 174 to be described later. A CCTV camera and recording device (not illustrated) installed in the casino game room 300 may record the displayed amount of money and cash inserted into the bill processor 140 is stored in the first drop box 120.

When an amount of money assumed by the customer P is different from an amount of money recognized by the bill processor 140 or when the customer P does not desire to purchase chips in cash, the customer P may request the dealer D to perform cancellation. At this time, the customer P may receive a bill returned from the rejecter 148 of the bill processor 140 by the dealer D pressing a 'cancel' button (not illustrated) on the monitor 180 to be described later.

The reader 150 may be provided in the upper portion of the body 110 and connected to the server 330 to be described later and information of a read card or barcode may be provided to the server 330. The reader 150 may also be connected to the monitor 180 to be described later and the customer display 172 to be described later and provide the read information to the dealer D and the customer P. The reader 150 may be configured to include an employee card reader 152, a barcode reader 154, and a customer card reader 156.

The employee card reader 152 may be installed in an upper portion of the body 110, for example, on a lower end of the monitor 180 to be described later, and the present invention is not limited thereto. The employee card reader 152 may be installed in an available space of the upper portion of the body 110 convenient for use. The employee card reader 152 may be connected to the server 330 to be described later to identify a read identity of the employee. One or both an integrated circuit (IC) card and a magnetic card may be used as the employee card.

The employee card reader 152 is connected to the server 330 to be described later for employees engaging in the casino such as the dealer D, the supervisor SP, and the security member CM. When the chips are insufficient or excessive on the corresponding casino table 200, the dealer D requests the casino cage 310 to fill or withdraw the chips. At this time, the employee card reader 152 may be used to identify an identity of the dealer D, the supervisor SP, or the security member CM related to the business of filling or withdrawing the chips.

The identities of the dealer D and the supervisor SP may be identified when the chips are filled, and the identity of the security member CM may be identified when the chips are withdrawn. This process may differ according to a casino operating system. The barcode reader 154 may be installed in the upper portion of the body 110, for example, on one side of the bill processor 140, and the present invention is not limited thereto. The barcode reader 154 may be installed in an available space of the upper portion of the body 110 convenient for use.

The barcode reader 154 may be connected to the server 330 to be described later, the monitor 180 to be described later, and the customer display 172 to be described later to read barcodes of tickets or barcodes of various types of forms and provide the read information to the customer P, the dealer D, the supervisor SP, and the security member CM. This will be specifically described hereinafter.

First, when the customer P purchases the chips using a ticket, the barcode reader 154 may display a read amount of money on the monitor 180 to be described later and the customer display 172 to be described later if the ticket presented by the customer P to the dealer D is read, so that the read information may be provided.

In addition, when the dealer D requests the casino cage 310 to be described later because of the lack of chips on the corresponding casino table 200, the barcode reader 154 displays data of types of chips, the number of chips, and a transaction type of a corresponding forms, etc. on the monitor 180 to be described later when reading a chips fill form received by the dealer D from the security member CM, so that the read information may be provided.

In addition, when the dealer D requests the casino cage 310 to be described later to withdraw the chips due to the excess of the chips in the corresponding casino table 200, the barcode reader 154 displays information of a corresponding form on the monitor 180 to be described later when reading a chips withdraw form on which types of the chips to be withdrawn and the number of chips are written, so that the read information may be provided.

The customer card reader 156 may be installed in the upper portion of the body 110, for example, on one side of the ticket printer 160, and the present invention is not limited thereto. The customer card reader 156 may be installed in an available space of the upper portion of the body 110 convenient for use.

The customer card reader 156 is connected to the server 330 to be described later, the monitor 180 to be described later, and the customer display 172 to be described later. When the customer P requests to purchase chips using a credit loan, the customer card reader 156 reads the customer card presented by the customer P to the dealer D. When an amount of money requested by the customer P is input to the monitor 180 to be described later, the input amount of money is displayed on the customer display 172 to be described later.

The ticket printer 160 may be installed in the upper portion of the body 110, and the present invention is not limited to any one portion. The ticket printer 160 may be arranged in an available space convenient for use.

When the customer P completing the game on the corresponding casino table 200 requests a exchange for chips, the dealer D causes the ticket printer 160 to print a ticket of an amount of money corresponding to chips of the customer P. The ticket printed by the ticket printer 160 may be a type of paper on which an amount of money, a barcode, etc. are written.

In addition, when the customer P informs the dealer D that the customer P desires to purchase chips with at least portion of the amount of money on the ticket, the dealer D inputs a smaller amount of money to buy the chips than the amount of money on the ticket on the monitor 180, so that the ticket printer 160 may print a ticket indicating the remaining amount of money and provide the ticket to the customer P.

The display 170 is connected to the server 330, the bill processor 140, the reader 150, the ticket printer 160, and the monitor 180, and may be installed in the upper portion of the body 110, for example, on the upper end of the bill processor 140, so that information may be provided to the customer P or information may be recorded on the CCTV camera and recording device installed in the casino game room 300. The display 170 may be configured to include the customer display 172 and the CCTV display 174, and may be a 7-segment display.

The customer display 172 may be installed in the upper portion of the body 110 so that a screen faces the customer P, and may display information to be identified by the customer P. Hereinafter, this will be specifically described.

First, when the customer P purchases chips in cash, an amount of money of a bill received by the dealer D from the customer P and inserted into the bill processor 140 is displayed on the customer display 172, so that the customer P may identify desired information through the customer display 172.

In addition, when the customer P purchases the chips using a ticket, an amount of money of a ticket received by the dealer D from the customer P and read by the barcode reader 154 is displayed on the customer display 172, so that the customer P may identify desired information through the customer display 172. In addition, the customer display 172 may display an amount of money with which the customer P desires to purchase the chips. The dealer D may be informed of the amount of money displayed on the customer display 172 at the request of the customer P, and the amount of money displayed may be smaller than the amount of money on the ticket.

In addition, when the customer P purchases the chips using a credit loan, an input amount of money is displayed on the customer display 172 if a customer card is received by the dealer D from the customer P and read by the customer card reader 156 and the amount of money requested by the customer P is input to the monitor 180 to be described later, so that the customer P may identify desired information through the customer display 172.

In addition, when the customer P requests to exchange the chips for a ticket, a total amount of money of the chips is displayed on the customer display 172 if the dealer D inputs types of chips of the customer P and the number of chips to the monitor 180 to be described later, so that the customer P may identify desired information through the customer display 172.

In addition, when the customer P repays a credit loan using the chips, a total amount of money of the chips is displayed on the customer display 172 if the dealer D inputs types of the chips of the customer P and the number of chips to the monitor 180 to be described later, so that the customer P may identify desired information through the customer display 172.

In the upper portion of the body 110, the CCTV display 174 may be installed so that the screen is directed to the CCTV camera and recording device of the casino game room 300. Information about all transactions performed on the corresponding casino table 200 may be displayed and photographed, recorded, and stored in the CCTV camera and the recording device. Hereinafter, this will be specifically described. Although not illustrated, the CCTV display 174 may include a plurality of indicating lights (for example, light-emitting diodes (LEDs)) configured to indicate states of 'chips purchase', 'chips exchange', 'chips fill', 'chips withdraw', 'cash', 'ticket', 'credit loan', 'tip', etc.

First, when the customer P purchases the chips in cash, the same amount of money as an amount of money of the cash displayed on the customer display 172 is displayed on the CCTV display 174, so that the CCTV camera and recording device may primarily photograph, record, and store a display result. Thereafter, when the cash is stored in the first drop box 120, the 'chips purchase' and 'cash' indicating lights blink while types of chips to be provided to the customer P, the number of chips, a transaction type, etc. are displayed on the CCTV display 174, so that the CCTV camera and recording device may secondarily photograph, record, and store a display result.

In addition, when the customer P purchases the chips using a ticket, the same amount of money as an amount of money of the ticket displayed on the customer display 172 is displayed on the CCTV display 174, so that the CCTV camera and recording device may primarily photograph, record, and store a display result. Thereafter, when the ticket is stored in the first drop box 120, the 'chips purchase' and 'ticket' indicating lights blink while types of chips to be provided to the customer P, the number of chips, a transaction type, etc. are displayed on the CCTV display 174, so that the CCTV camera and recording device may secondarily photograph, record, and store a display result. At this time, a smaller amount of money requested by the customer P than the amount of money on the ticket, rather than the same amount of money as the amount of money on the ticket, may be displayed on the CCTV display 174. In other words, when the customer P informs the dealer D that the customer P desires to purchase the chips with at least portion of the amount of money on the ticket, the CCTV display 174 may display the amount of money (at least portion of the amount of money on the ticket) input by the dealer D on the monitor 180, so that the CCTV camera and recording device may photograph, record, and store the amount of money input by the dealer D.

In addition, when the customer P purchases the chips using a credit loan, the same amount of money as an amount of money of the credit loan displayed on the customer display 172 is displayed on the CCTV display 174, so that the CCTV camera and recording device may primarily photograph, record, and store a display result. Thereafter, the 'chips purchase' and 'credit loan' indicating lights blink while types of chips to be provided to the customer P, the number of chips, a transaction type, etc. are displayed on the CCTV display 174, so that the CCTV camera and recording device may secondarily photograph, record, and store a display result.

In addition, when the customer P requests to exchange the chips for a ticket, the 'chips exchange' and 'ticket' indicating lights blink while types of the exchanged chips and the number of exchanged chips are displayed on the CCTV display 174 when the dealer D presses the 'OK' button on the monitor 180 to be described later after the customer P identifies and confirms a total amount of money of the chips displayed on the customer display 172, so that the CCTV camera and recording device may photograph, record, and store a display result.

In addition, when the customer P requests to repay the credit loan using the chips, the 'chips exchange' and 'credit loan' indicating lights blink while types of the repayment chips and the number of repayment chips are displayed on the CCTV display 174 when the dealer D presses the 'OK' button on the monitor 180 to be described later after causing the customer card reader 156 to read the customer card if the customer P identifies and confirms a total amount of money of the chips displayed on the customer display 172, so that the CCTV camera and recording device may photograph, record, and store a display result.

In addition, when the dealer D stores the chips received as a tip from the customer P, the dealer D inputs a 'tip' button (not illustrated) representing the transaction in which the dealer D receives and stores the chips as the tip from the customer P on the monitor 180 and inserts the tip chips into the second drop box 130 and the 'tip' indicating light blinks while types of the chips and the number of chips recognized by an RF reader (not illustrated) of the second drop box 130 are displayed on the CCTV display 174, so that the CCTV camera and recording device may photograph, record, and store a display result.

In addition, when the dealer D requests the casino cage 310 to fill the chips, the dealer D compares content written on a chips fill form to content displayed on the monitor 180 to be described later and the 'chips fill' indicating light blinks while types of chips and the number of chips are displayed on the CCTV display 174 according to an input of 'OK' to the monitor 180 when the content matches after types of actual chips and the number of actual chips delivered from the security member CM are compared to the types of chips and the number of chips displayed on the monitor 180, so that the CCTV camera and recording device may photograph, record, and store a display result.

In addition, when the dealer D requests the casino cage 310 to withdraw the chips, the security member CM of the casino cage 310 compares three types of content of actual chips, content written on a form, and content displayed on the monitor 180 and the 'chips withdraw' indicating light blinks while types of the chips and the number of chips are displayed on the CCTV display 174 according to an input of 'OK' to the monitor 180 when the content matches, so that the CCTV camera and recording device may photograph, record, and store a display result.

The monitor 180 may be provided in the upper portion of the body 110 and may be preferably arranged at a position at which an employee may conveniently use the monitor 180. The monitor 180 may be a liquid crystal display (LCD) touch screen.

The monitor 180 is connected to the server 330, the bill processor 140, the reader 150, the ticket printer 160, the display 170, and the monitor 180, and may display information about all transactions performed on the corresponding casino table 200 so that the dealer D, the supervisor SP, and the security member CM may identify the displayed information. Hereinafter, this will be specifically described.

First, when the customer P purchases the chips in cash, an amount of money of a normal bill inserted into the bill processor 140 is displayed on the monitor 180, the dealer D presses the 'OK' button on the monitor 180 with agreement from the customer P, and types of chips to be provided to the customer P, the number of chips, a transaction type, etc. are displayed when the cash is stored in the first drop box 120, so that the dealer D, the supervisor SP, or etc. may identify desired information through the monitor 180.

In addition, when the customer P purchases the chips using a ticket, an amount of money of the ticket read by the barcode reader 154 is displayed on the monitor 180, the dealer D presses the 'OK' button on the monitor 180 with agreement from the customer P, and types of chips to be provided to the customer P, the number of chips, a transaction type, etc. are displayed when the ticket is stored in the first drop box 120, so that the dealer D, the supervisor SP, or etc. may identify desired information through the monitor 180. At this time, when the customer P does not simply agree but informs the dealer D that the customer P desires to purchase chips with at least portion of the amount of money on the ticket, the dealer D may input an amount of money to purchase the chips before pressing the 'OK' button, and then press the 'OK' button. The amount of money (at least portion of the amount of money on the ticket) presented by the customer P is displayed on the monitor 180, so that the dealer D or the supervisor SP may identify the amount of money. In addition, the monitor 180 may transfer information about the remaining amount of money, except for the amount of money to be used by the customer P to purchase the chips, to the ticket printer 160, so that a ticket corresponding to the remaining amount of money not used to buy the chips by the customer P may be provided to the customer P.

In addition, when the customer P purchases the chips using a credit loan, an amount of money required by the customer P is input to the monitor 180 while the dealer D causes the customer card reader 156 to read the customer card, the dealer D presses the 'OK' button on the monitor 180 with agreement from the customer P, and types of chips to be provided to the customer P, the number of chips, a transaction type, etc. are displayed, so that the dealer D, the supervisor SP, or etc. may identify desired information through the monitor 180.

In addition, when the customer P exchanges the chips for a ticket, types of the exchanged chips for the customer P and the number of exchanged chips are displayed on the monitor 180 if the dealer D receives the chips from the customer P and inputs types of the chips and the number of chips to the monitor 180, so that the dealer D, the supervisor SP, or etc. may identify desired information through the monitor 180. Thereafter, when the dealer D presses the 'OK' button (not illustrated) on the monitor 180 with agreement from the customer P, the exchange may be achieved.

In addition, when the customer P requests to repay the credit loan using the chips, types of the repayment chips for the customer P and the number of repayment chips are displayed on the monitor 180 if the dealer D receives the chips from the customer P and inputs types of the chips and the number of chips to the monitor 180 while causing the customer card reader 156 to read the customer card, so that the dealer D, the supervisor SP, or etc. may identify desired information through the monitor 180. Thereafter, when the dealer D presses the 'OK' button (not illustrated) on the monitor 180 with agreement from the customer P, the repayment may be achieved.

In addition, when the dealer D stores the chips received as a tip, types of chips and the number of chips read by the RF reader (not illustrated) of the second drop box 130 are displayed on the monitor 180 if the dealer D receives the chips as the tip from the customer P, inputs the 'tip' button to the monitor 180, and stores the tip chips in the second drop box 130, so that the dealer D, the supervisor SP, or etc. may identify desired information through the monitor 180.

In addition, when the dealer D requests the casino cage 310 to fill the chips, the dealer D inputs types of the chips and the number of chips to the monitor 180, and types of chips and the number of filled chips are displayed on the monitor 180 according to an 'OK' input to the monitor 180 if the types of chips and the number of chips match after the dealer D compares types of chips and the number of chips displayed on the monitor 180 to those of a chips fill form delivered from the security member CM and those of actual chips, so that the dealer D, the supervisor SP, or the security member CM may identify desired information through the monitor 180.

In addition, when the dealer D requests the casino cage 310 to withdraw the chips, the dealer D inputs types of chips and the number of chips to the monitor 180, types of the withdrawn chips and the number of withdrawn chips are displayed on the monitor 180 according to an 'OK' input to the monitor 180 if the types of the chips and number of chips match after the security member CM compares types of chips and the number of chips displayed on the monitor 180 to those of a chips withdraw form delivered by the dealer D and those of actual chips, so that the dealer D, the supervisor SP, or the security member CM may identify desired information through the monitor 180.

The computer 190 is provided inside the body 110 of the casino device 100, and connects elements provided in the body 110 to a network. At this time, the computer 190 may connect the casino device 100, the casino management system (CMS) 320 to be described later, etc. through wired/wireless communication technology which is widely used in general. That is, the reader 150, the display 170, the monitor 190, etc. of the casino device 100 may perform communication through the computer 190.

The casino device 100 may further include a form printer (not illustrated). As a configuration in which a form is printed, the form printer may be provided at a position at which it is easy for the dealer D to have access such as in the upper portion of the body 110.

When the customer P desires to receive the credit loan, the form printer may print a credit loan form on which an amount of money input to the monitor 180 is written when the dealer D inputs an amount of money requested by the customer P to the monitor 180 while causing the customer card reader 156 to read the customer card of the customer P.

When the customer P requests to repay the credit loan, the form printer may print a repayment form on which types of chips and the number of chips input to the monitor 180, a total amount of money, etc. are written if the dealer D receives the chips and inputs the types of the chips and the number of chips to the monitor 180.

When the dealer D requests the casino cage 310 to withdraw the chips, the form printer may print a chips withdraw form on which types of the chips and the number of chips input to the monitor 180, a total amount of money, etc. are written if the dealer D inputs the types of the chips and the number of chips to the monitor 180.

The chips fill form to be used when the dealer D requests the casino cage 310 to fill the chips may be printed by a form printer (not illustrated) provided in the main cage 312 as will be described later.

According to this exemplary embodiment, it is possible to prevent a handwriting error or unfair practices from occurring in advance when the dealer directly creates the form by enabling the form printer to print various types of forms as described above.

In order to implement this process, the form printer is connected to the monitor 180 in a wired/wireless form to transmit and receive data, and connected to the casino cage 310, the CMS 320, and the server 330 through the network or the like.

As illustrated in FIG. 2, the casino table 200 may be configured to include the casino device 100, a game space 210, and a chips tray 220. Casino employees such as the dealer D, the supervisor SP, and the security member CM may be arranged at the casino table 200 so that a plurality of customers P may play the game.

The casino device 100 may be installed on a lower end of the game space 210 on one side of the dealer D so that the supervisor SP and the security member CM as well as the dealer D conveniently use the casino device 100. Because a configuration of the casino device 100 has been specifically described above, description thereof is omitted here.

The game space 210 may be configured to include a betting region 212 in which the customer P places betting chips, and a center region 214 in which a card for the game is open or the dealer D takes losing chips or pays winning chips when the game ends. The game space 210 is defined as a space provided for the customers P to play the game. Because the game space 210 may include a configuration of a generally used game space in an example of the present invention, detailed description of the game space 210 to be applied to the present invention is omitted.

The chips tray 220 is provided in the game space 210 before the dealer D and may store a plurality of chips necessary for the game.

The chips tray 220 is defined as a mechanism configured to store a plurality of chips. Because the chips tray 220 may include a configuration of a generally used chips tray in an example of the present invention, detailed description of the chips tray 220 to be applied to the present invention is omitted.

As illustrated in FIG. 3, the casino game room 300 includes the casino table 200, the casino cage 310, the CMS 320, and the server 330.

The casino table 200 is a place in which a plurality of customers P can play the game at the same time. Because the configuration of the casino table 200 has been described above, description thereof is omitted here.

A plurality of casino tables 200 are arranged in the casino game room 300. A casino manager such as the supervisor SP and the security member CM of the casino cage 310 to be described later may be caused to manage two to eight casino tables as one pit.

The casino cage 310 is a place in which a transaction record, cash, chips, or the like are managed in a secure region within a gaming facility, and may be divided into a main cage 312 and a cashier cage 314. The casino cage 310 may operate in units of pits, each of which includes a plurality of casino tables 200. In the casino cage 310, a device such as a terminal capable of communicating with various devices as well as the casino device 100 of the casino table 200 in a wired/wireless form is arranged.

The main cage 312 is a place in which members such as security members CM work and the chips are filled for the dealer D or withdrawn from the dealer D according to a request of the dealer D.

The cashier cage 314 is a place in which an employee works to exchange and record transaction. In the cashier cage 314, cash may be paid for chips or a ticket received from the customer P or transactions of chips and various types of forms with the main cage 312 may be performed.

The casino management system 320 may operate in units of pits, each of which includes a plurality of casino tables 200, and is configured between the casino cage 310 and the server 330 to be described later and may transmit and receive data to and from the casino cage 310 using wired/wireless communication.

The server 330 may be arranged in a central office of the casino game room 300. Because the server 330 may perform wired/wireless communication with the CMS 320, the server 330 may control the casino management system 320, the casino cage 310, the casino table 200, and the casino device 100.

[Specific Content of Present Invention Based on Transaction Pattern]

Overall cash and chips handling to be performed in the casino table 200 or the casino game room 300 using the above-described casino device 100 will be described with reference to FIGS. 1 to 3 again.

The cash and chips handling may be divided into cash and chips handling processes in which the dealer D pays or takes the chips related to the game progress according to a result of winning or losing after the customer P bets the chips in the real game and cash and chips handling processes not related to the game progress.

Cash and chips handling processes not related to the game progress, for example, are chips purchase, chips exchange, storage of chips received as a tip, chips fill, chips withdraw, etc. Hereinafter, all the cash and chips handling processes not related to the game progress will be described.

The chips purchase, the chips exchange, and the storage of the chips received as the tip are cash and chips handling processes to be performed between the customer P and the dealer D, and the chips fill and the chips withdraw are cash and chips handling processes to be performed between the dealer D and the main cage 312.

First, the chips purchase serves as the cash and chips handling process to be performed when the customer P who desires to continue to play the game on the corresponding casino table 200 requests the dealer D to purchase the chips. The chips purchase may be divided into a process of purchasing the chips in cash, a process of purchasing the chips using a ticket, and a process of purchasing the chips using a credit loan.

A transaction sequence when the customer P purchases the chips in cash is as follows. The dealer D inserts a bill presented by the customer P into the bill processor 140.

The bill processor 140 validates whether the bill is normal, and an amount of money of the normal bill is displayed on the monitor 180 and the customer display 172. When the customer P identifies and confirms the amount of money displayed on the customer display 172, the dealer D presses an 'OK' button (not illustrated) on the monitor 180.

When the same amount of money as an amount of money displayed on the customer display 172 is displayed on the CCTV display 174, the displayed money amount is recorded on the CCTV camera and recording device (not illustrated). Cash inserted into the bill processor 140 is stored in the first drop box 120.

Types of chips to be provided to the customer P, the number of chips, a transaction type, etc. are displayed on the monitor 180 and the CCTV display 174. The 'chips purchase' and 'cash' indicating lights (not illustrated) blink and this state is recorded on the CCTV camera and recording device.

When the dealer D provides chips corresponding to a bill presented by the customer P to the customer P, the transaction of purchasing the chips in cash between the customer P and the dealer D ends.

On the other hand, when the customer P purchases the chips in a large amount of cash, the dealer D requests the customer P to provide a customer card, causes the customer card reader 156 to read the customer card, and identifies an identity of the customer so as to prevent money laundering. At this time, the supervisor SP may identify the identity of the customer P along with the dealer D.

Accordingly, it is possible to prevent a conflict with the customer P from occurring in advance because the dealer D cancels a transaction by pressing a 'cancel' button (not illustrated) on the monitor 180 to return a bill to the customer P when the amount of money assumed by the customer P is different from the amount of money assumed by the bill processor 140 in this exemplary embodiment.

In addition, it is possible to save the time of the dealer D and prevent an error because an amount of cash money, the types of chips to be provided, and the number of chips are displayed on the monitor 180.

In addition, it is possible to prevent unfair practices because an amount of cash money, the types of chips to be provided, the number of chips, and the transaction type are displayed on the CCTV display 174 and recorded on the CCTV camera and recording device.

A transaction sequence in which the customer P purchases the chips using the ticket is as follows.

The dealer D causes the barcode reader 154 to read a ticket presented by the customer P.

An amount of money of the ticket read by the barcode reader 154 is displayed on the monitor 180 and the customer display 172. When the customer P identifies and confirms the amount of money displayed on the customer display 172, the dealer D presses the 'OK' button on the monitor 180. As described above, the customer P may inform the dealer D that the customer P desires to purchase the chips with a portion of the amount of money on the ticket. When the customer P desires to purchase the chips with a portion of the amount of money on the ticket, the dealer D may input an amount of money (at least portion of the amount of money on the ticket) to purchase the chips at the request of the customer P on the monitor 180, and press the 'OK' button with agreement from the customer P.

When the same amount of money as the amount of money displayed on the customer display 172 or the amount of money (at least portion of the amount of money on the ticket) requested by the customer P to buy the chips is displayed on the CCTV display 174, the displayed amount of money is recorded on the CCTV camera and recording device. The inserted ticket is stored in the first drop box 120.

Types of chips to be provided to the customer P, the number of chips, a transaction type, the remaining amount of money not used to buy the chips of the amount of money on the ticket, etc. are displayed on the monitor 180 and the CCTV display 174, the 'chips purchase' and 'ticket' indicating lights (not illustrated) blink on the CCTV display 174 and this state is recorded on the CCTV camera and recording device.

When the dealer D provides the customer P with chips corresponding to the amount of money requested to purchase by the customer P presenting the ticket, the transaction of purchasing the chips using the ticket between the customer P and the dealer D ends. However, when the customer P desires to purchase chips with a portion of the amount of money on the ticket, the dealer D may output a ticket on which the remaining amount of money not used to purchase the chips, of the amount of money on the ticket, is printed, to the ticket printer 160, and provide the customer P with this ticket along with the chips.

Accordingly, it is possible to prevent a conflict with the customer P from occurring in advance because the dealer D cancels the transaction by pressing the 'cancel' button (not illustrated) on the monitor 180 to return the ticket to the customer P when the amount of money assumed by the customer P is different from the amount of money read by the barcode reader 154 in this exemplary embodiment.

In addition, it is possible to save the time of the dealer D and prevent an error because an amount of money of the ticket, the types of chips to be provided, and the number of chips are displayed on the monitor 180.

In addition, it is possible to prevent unfair practices because the amount of money of the ticket, the types of chips to be provided, the number of chips, and the transaction type are displayed on the CCTV display 174 and recorded on the CCTV camera and recording device.

A transaction sequence in which the customer P purchases the chips using the credit loan is as follows.

The dealer D causes the customer card reader 156 to read the customer card presented by the customer P and input an amount of money requested by the customer P to the monitor 180.

When the input amount of money is displayed on the customer display 172 and identified and confirmed by the customer, the dealer D presses the 'OK' button (not illustrated) on the monitor 180.

When the same amount of money as the amount of money displayed on the customer display 172 is displayed on the CCTV display 174, the displayed amount of money is recorded on the CCTV camera and recording device.

Types of chips to be provided to the customer P, the number of chips, a transaction type, etc. are displayed on the monitor 180 and the CCTV display 174, the 'chips purchase' and 'credit loan' indicating lights (not illustrated) blink on the CCTV display 174, and this state is recorded on the CCTV camera and recording device.

The dealer D provides chips corresponding to the amount of money requested by the customer P to the customer P.

The dealer D writes an amount of money of the loan on a credit loan form (not illustrated), the dealer D and the supervisor SP write their signatures on the credit loan form, and the credit loan form is inserted into the second drop box 130, so that the transaction of purchasing the chips using the credit loan between the customer P and the dealer D ends.

At this time, the credit loan form may be output by the form printer (not illustrated) capable of being provided in the casino device 100, and the form printer can generate the form on which an amount of money input by the dealer D to the monitor 180 is printed. At this time, the dealer D and the supervisor SP may write their signatures on the output form and the form may be inserted into the second drop box 130.

Accordingly, it is possible to prevent unfair practices, save the time of the dealer D, and prevent errors because an amount of money of the credit loan, the types of chips to be provided, the number of chips, and the transaction type are displayed on the CCTV display 174 and recorded on the CCTV camera and recording device in this exemplary embodiment.

Second, the chips exchange is a cash and chips handling process to be performed when the customer P completing the game on the corresponding casino table 200 requests the dealer D to give a exchange for the chips, and may be divided into a process of exchanging the chips for a ticket and a process of repaying the credit loan using the chips.

A transaction sequence in which the customer P exchanges the chips for the ticket is as follows.

When the customer P requests to exchange his/her own chips for the ticket, the dealer D receives the chips from the customer P and inputs types of the chips and the number of chips to the monitor 180 and a total amount of money of the chips is displayed on the customer display 172.

If the customer P identifies and confirms the total amount of money displayed on the customer display 172, the dealer D presses the 'OK' button (not illustrated) on the monitor 180.

Types of the chips exchanged for the customer P, the number of chips, the transaction type, etc. are displayed on the monitor 180 and the CCTV display 174, the 'chips exchange' and 'ticket' indicating lights (not illustrated) blink on the CCTV display 174, and this state is recorded on the CCTV camera and recording device.

The dealer D provides the customer P with the ticket printed by the ticket printer 160 and withdraws the chips of the customer P, so that the transaction of exchanging the chips for the ticket between the customer P and the dealer D ends.

In the chips exchange, the approval of the supervisor SP may be necessary.

Accordingly, it is possible to save the time of the dealer D, and prevent an error, and prevent a conflict with the customer P from occurring in advance because a total amount of money is calculated and confirmed by the customer P when the dealer D inputs the types of chips to be exchanged by the customer P and the number of chips in this exemplary embodiment.

In addition, it is possible to prevent unfair practices from occurring because the types of chips to be exchanged by the customer P, the number of chips, and a transaction type are displayed on the CCTV display 174 and recorded on the CCTV camera and recording device.

In addition, because the customer P does not move the chips from the corresponding casino table 200 to another casino table, it is possible to reduce the lack of chips on the corresponding casino table 200, reduce the number of operations in which the dealer D requests the main cage 312 to fill the chips, save time, reduce errors, and prevent unfair practices from occurring.

In addition, a customer satisfaction rate may be improved because an operation of taking one ticket is more convenient than an operation of carrying large-volume chips in terms of the customer P.

A transaction sequence in which the customer P repays the credit loan using the chips is as follows.

When the customer P requests to repay the credit loan using his/her own chips, the dealer D receives the chips from the customer P and inputs types of the chips and the number of chips to the monitor 180 while causing the customer card reader 156 to read the customer card, and a total amount of money of the chips is displayed on the customer display 172.

If the customer P identifies and confirms the total amount of money displayed on the customer display 172, the dealer D presses the 'OK' button on the monitor 180.

Types of repayment chips for the customer P and the number of repayment chips are displayed on the monitor 180 and the CCTV display 174, the 'chips exchange' and 'credit loan' indicating lights (not illustrated) blink on the CCTV display 174 and this state is recorded on the CCTV camera and recording device.

The dealer D writes an amount of money of the loan on a repayment form (not illustrated), the dealer D and the supervisor SP write their signatures on the repayment form, and the repayment form is inserted into the second drop box 130, so that the transaction of repaying the credit loan using the chips between the customer P and the dealer D ends.

At this time, the repayment form may be printed by the form printer. The form printer may output the repayment form on which a total amount of money is printed based on types of chips and the number of chips input by the dealer D to the monitor 180. After the dealer D and the supervisor SP write their signatures on the printed repayment form, the form may be inserted into the second drop box 130.

Accordingly, it is possible to save the time of the dealer D, and prevent an error, and prevent a conflict with the customer P from occurring in advance because a total amount of money is calculated and confirmed by the customer P when the dealer D inputs the types of chips and the number of chips for repayment by the customer P in this exemplary embodiment.

In addition, it is possible to prevent unfair practices from occurring because an amount of money for repaying the credit loan, types of the repayment chips, the number of repayment chips, and a transaction type are displayed on the CCTV display 174 and recorded on the CCTV camera and recording device.

Third, the storage of chips received as the tip is a cash and chips handling process to be performed when the dealer D stores the chips received as the tip from the customer P in a baccarat game or the like.

A transaction sequence when the dealer D stores chips received as a tip is as follows. The dealer D receives the chips as the tip from the customer P, inputs the 'tip' button on the monitor 180, and inserts the tip chips into the second drop box 130.

In the case of chips equipped with an RF identification (RFID), types of the chips and the number of chips are recognized by the RF reader (not illustrated) and displayed on the monitor 180 and the CCTV display 174. In addition, the 'tip' indicating light (not illustrated) blinks on the CCTV display 174 and this state is recorded on the CCTV camera and recording device. The transaction of storing the chips received as the tip between the customer P and the dealer D ends.

When the chips received as the tip are stored, the approval of the supervisor SP may be necessary.

Accordingly, it is possible to save a processing time for chips received as a tip and prevent a conflict between dealers and unfair practices from occurring when the tip is calculated because the total of chips received as the tip is accurately calculated.

Fourth, the chips fill is cash and chips handling process to be performed when the dealer D requests the main cage 312 to fill the chips.

A transaction sequence when the dealer D requests to fill the chips is as follows.

When the dealer D requests the main cage 312 to fill the chips by inputting types of chips and the number of chips to the monitor 180, the security member CM of the main cage 312 writes the types of chips and number of chips on the chips fill form and delivers chips in number and type equal to those requested by the dealer D to the dealer D.

At this time, the chips fill form may be printed by a form printer (not illustrated) separately provided in the main cage 312, and the form printer may output the chips fill form on which types of chips and the number of chips input by the dealer D through the monitor 180 and a total amount of money are written to provide the output chips fill form to the security member CM.

The dealer D causes the barcode reader 154 to read the chips fill form for chips delivered from the security member CM.

The monitor 180 receives and displays data such as types of chips, the number of chips, a transaction type, etc. of the corresponding form from the CMS 320.

In addition, the dealer D compares content written on a chips fill form to content displayed on the monitor 180, compares types of chips and the number of chips displayed on the monitor 180 to those of actual chips delivered from the security member CM, and inputs 'OK' to the monitor 180 if the types of chips and the number of chips match.

Types of filled chips and the number of filled chips are displayed on the monitor 180 and the CCTV display 174, the 'chips fill' indicating light (not illustrated) blinks on the CCTV display 174, and this state is recorded on the CCTV camera and recording device.

The dealer D and the supervisor SP cause the employee card reader 152 to read a dealer card and a supervisor card.

The transaction in which the dealer D and the supervisor SP fill chips by writing their signatures on the chips fill form and storing the chips fill form in the second drop box 130 ends.

Accurate processing rather than time saving is more important because a large number of chips are handled in the chips fill. Accordingly, in this exemplary embodiment, in the CMS 320, it is possible to prevent an error by adding a procedure of comparing the form to data received online.

In addition, it is possible to prevent unfair practices because types of chips, the number of chips, and a transaction type are displayed on the CCTV display 174 and recorded on the CCTV camera and recording device.

Fifth, chips withdraw is a cash and chips handling process to be performed when the dealer D requests the main cage 312 to withdraw chips.

A transaction sequence when the dealer D requests to withdraw the chips is as follows.

The dealer D writes types of chips and the number of chips on the chips withdraw form and causes the barcode reader 154 to read the chips withdraw form and input the types of chips and the number of chips to the monitor 180.

At this time, the chips withdraw form may be output by the form printer of the casino device 100 and the form printer may print a chips withdraw form on which types of chips and the number of chips input by the dealer D to the monitor 180, a total amount of money, etc. are written and provide the printed chips withdraw form to the dealer D.

The security member CM of the main cage 312 compares three types of content of actual chips, content written on a form, and content displayed on the monitor 180, inputs 'OK' to the monitor 180 when the content matches, and causes the employee card reader 152 to read the security member card.

Types of withdrawn chips and the number of withdrawn chips are displayed on the monitor 180 and the CCTV display 174, the 'chips withdraw' indicating light (not illustrated) blinks on the CCTV display 174, and this state is recorded on the CCTV camera and recording device.

The transaction in which the dealer D, the supervisor SP, and the security member CM fill chips by writing their signatures on the chips withdraw form, storing the chips withdraw form in the second drop box 130, and enabling the security member CM to take the chips ends.

Accurate processing rather than time saving is more important because the chips withdraw is the work of handling a large number of chips. Accordingly, in this exemplary embodiment, it is possible to prevent an error when chips are withdrawn by adding a procedure of comparing three types of content of actual chips, content written on a form, and content input to the monitor 180.

In addition, it is possible to prevent unfair practices from occurring because the types of chips, the number of chips, and the transaction type are displayed on the CCTV display 174 and recorded on the CCTV camera and recording device.

In this manner, in this exemplary embodiment, the dealer D may store all content occurring between the dealer D and the customer P at the time of cash and chips handling such as chips purchase, chips exchange, or storage of chips received as a tip in real time so that the content may be identified by the dealer D, the customer P, and a manager in real time, and store all content occurring between the dealer and the casino cage 310 at the time of cash and chips handling such as chips fill and chips withdraw in real time so that the content may be identified by the dealer D, the supervisor SP, and the security member CM in real time. Accordingly, the time of the dealer D may be saved in the cash and chips handling process on the casino table 200, errors and unfair practices in the cash and chips handling process of the dealer D may be prevented, and a customer satisfaction rate may be improved.

In addition, in this exemplary embodiment, a ticket is available on the casino table 200.

In addition, in this exemplary embodiment, the dealer D and the supervisor SP may identify states of the drop boxes 120 and 130 in real time by electronically configuring the drop boxes 120 and 130.

Although the present invention has been described above in detail with reference to specific exemplary embodiments, the technical scope of the present invention is not limited to the scope of the abovementioned embodiments. It is apparent to those skilled in the art that various alterations and improvements can be made to the abovementioned embodiments.

Simple modifications or changes of the present invention belong to the scope of the present invention, and the detailed scope of the present invention will be more clearly understood with reference to the accompanying claims.

The invention claimed is:

1. A method of transaction using a casino device provided in each of a plurality of casino tables including a space for enabling a customer to play a game by exchanging chips with an employee offline, and a chips tray storing the chips, the method comprising:

printing, by a ticket printer of the casino device provided in one of the plurality of casino tables, a ticket on which an exchange is displayed so as to be exchanged with the chips corresponding to the displayed exchange in another casino table when the customer requests the employee to exchange the chips; and reading, by a reader of the casino device provided on the one of the plurality of casino tables, the ticket printed from the ticket printer of the casino device provided on the another casino table, wherein when the customer moves from the one of the plurality of casino tables to the another casino table, the customer carries the ticket printed from the ticket printer of the casino device provided on the one of the plurality of casino tables instead of the chips, and exchanges the ticket with the chips by causing the reader of the casino device provided on the another casino table to read the ticket, so that a stock out of the chips stored in the chips tray of the one of the plurality of casino tables is prevented, wherein the casino device comprises:

at least one drop box provided within a body and configured to store cash, tickets, forms, and tip chips;

a bill processor provided in an upper portion of the body and used to check cash of the customer;

the reader provided in the upper portion of the body and configured to read an employee card, a customer card, a barcode of a ticket, or a barcode of a form;

the ticket printer provided in the upper portion of the body and configured to print the ticket on which the exchange is displayed;

a display provided in the upper portion of the body and configured to provide money amount information to the customer, a closed circuit television (CCTV) camera and a recording device; and a monitor provided in the upper portion of the body and configured to provide the employee with the money amount information provided to the display and transaction information between employees or between the employee and the customer.

2. The method of transaction using the casino device of claim 1, wherein the reader includes:
   an employee card reader used to identify an identity of the employee by recognizing the employee card;
   a barcode reader configured to read a barcode of the ticket or the form; and
   a customer card reader used to identify an identity of the customer by recognizing the customer card.

3. The method of transaction using the casino device of claim 2, wherein the display includes:
   a customer display configured to provide the money amount information to the customer; and
   a CCTV display configured to display the money amount information to the CCTV camera and recording device.

4. The method of transaction using the casino device of claim 3, wherein the CCTV display includes a plurality of indicating lights configured to indicate states of 'chips purchase', 'chips exchange', 'chips fill', 'chips withdraw', 'cash', 'ticket', 'credit loan', and 'tip'.

5. The method of transaction using the casino device of claim 4, further comprising:
   checking the cash of the customer by the bill processor;
   displaying an amount of money of the cash inserted into the bill process on the customer display;
   displaying, by the CCTV display, the same money amount as the amount of money of the cash displayed on the customer display toward the CCTV camera and the recording device to enable the CCTV camera and the recording device to photograph, record, or store a display result;
   displaying the amount of cash inserted into the bill processor on the monitor and inputting an 'OK' button to the monitor by the employee;
   displaying types of chips to be provided to the customer, the number of chips, and a transaction type on the monitor when the cash is stored in the drop box; and
   turning on the 'chips purchase' and 'cash' indicating lights by the CCTV display while displaying the types of chips to be provided to the customer, the number of chips, and a transaction type on the CCTV camera and the recording device when the cash is stored in the drop box.

6. The method of transaction using the casino device of claim 4, further comprising:
   reading a barcode of the ticket by the barcode reader;
   displaying an amount of money of the ticket read by the barcode reader on the customer display;
   displaying, by the CCTV display, the same money amount as the amount of money of the ticket displayed on the customer display toward the CCTV camera and the recording device to enable the CCTV camera and the recording device to photograph, record, or store a display result;
   displaying the amount of the ticket read by the barcode reader on the monitor and inputting an 'OK' button to the monitor by the employee;
   displaying types of chips to be provided to the customer, the number of chips, and a transaction type on the monitor when the ticket is stored in the drop box; and
   turning on the 'chips purchase' and 'ticket' indicating lights by the CCTV display while displaying the types of chips to be provided to the customer, the number of chips, and a transaction type on the CCTV camera and the recording device when the ticket is stored in the drop box.

7. The method of transaction using the casino device of claim 4, further comprising:
   recognizing a customer card of the customer by the customer card reader;
   inputting an amount of money of a credit loan requested by the customer by the employee to the monitor and inputting an 'OK' button to the monitor by the employee;
   displaying the amount of money of the credit loan input to the monitor on the customer display;
   displaying, by the CCTV display, the same money amount as the amount of money of the credit loan displayed on the customer display toward the CCTV camera and the recording device to enable the CCTV camera and the recording device to photograph, record, or store a display result;
   displaying types of chips to be provided to the customer, the number of chips, and a transaction type on the monitor; and
   turning on the 'chips purchase' and 'credit loan' indicating lights by the CCTV display while displaying the types of chips to be provided to the customer, the number of chips, and a transaction type on the CCTV camera and the recording device.

8. The method of transaction using the casino device of claim 4, further comprising:
   displaying types of the chips of the customer and the number of chips input by the employee so as to be exchanged with the ticket on the monitor, and inputting an 'OK' button to the monitor by the employee;
   displaying a total amount of money of the chips based on the types of the chips of the customer and the number of chips input to the monitor on the customer display; and
   turning on the 'chips exchange' and 'ticket' indicating lights by the CCTV display while displaying types of the exchanged chips and the number of chips on the CCTV camera and the recording device when the employee inputs an 'OK' button to the monitor.

9. The method of transaction using the casino device of claim 4, further comprising:
   displaying types of the chips of the customer and the number of chips input by the employee so as repay a credit loan on the monitor, and inputting an 'OK' button to the monitor by the employee;
   displaying a total amount of money of the chips based on types of the chips of the customer and the number of chips input to the monitor on the customer display; and
   turning on the 'chips exchange' and 'credit loan' indicating lights by the CCTV display while displaying types of the repaid chips and the number of chips on the CCTV camera and the recording device when the employee inputs an 'OK' button to the monitor.

10. The method of transaction using the casino device of claim 4, further comprising:
    inputting a 'tip' button to the monitor by the employee;
    turning on the 'tip' indicating light by the CCTV display while displaying types of the chips and the number of chips read by an RF reader of the drop box on the CCTV camera and the recording device when tip chips are stored in the drop box; and
    displaying the types of chips and the number of chips read by the RF reader of the drop box storing the tip chips on the monitor.

11. The method of transaction using the casino device of claim 4, further comprising:
    inputting types of the chips and the number of chips to fill chips to the monitor by the employee;

inputting an 'OK' button to the monitor by another employee;
displaying the types of the filled chips and the number of chips on the monitor; and
turning on the 'chips fill' indicating light by the CCTV display while displaying the types of the filled chips and the number of chips on the CCTV camera and the recording device.

12. The method of transaction using the casino device of claim 4, further comprising:
inputting types of chips and the number of chips to withdraw the chips to the monitor by the employee;
inputting an 'OK' button to the monitor by another employee;
displaying the types of the withdrawn chips and the number of chips on the monitor; and
turning on the 'chips withdraw' indicating light by the CCTV display while displaying the types of the withdrawn chips and the number of chips on the CCTV camera and the recording device.

* * * * *